3,508,933
AUTOMOBILE POLISH

Gerald P. Yates, Midland, Mich., assignor to Dow Corning Corporation, Midland, Mich., a corporation of Michigan
No Drawing. Filed Feb. 20, 1967, Ser. No. 617,064
Int. Cl. C08h 9/06; C09a 1/08
U.S. Cl. 106—10                                    10 Claims

ABSTRACT OF THE DISCLOSURE

Wax containing automobile polishes are made detergent resistant by incorporating therein the reaction product of a hydroxyl endblocked polydimethylsiloxane having a viscosity in the range of 10 to 15,000 cs., and a silane selected from the group consisting of those having the general formulae $R''_n(R'O)_{3-n}Si(CH_2)_3NHR'''$ and $$R''_n(R'O)_{3-n}SiRNHCH_2CH_2NH_2$$

wherein $R'''$ is a hydrogen atom or a methyl radical, $R''$ is a monovalent hydrocarbon radical free of aliphatic unsaturation and contains from 1 to 6 carbon atoms, $n$ has a value of from 0 to 2, $R'$ is an alkyl radical containing from 1 to 4 carbon atoms, and R is a divalent hydrocarbon radical free of aliphatic unsaturation and contains 3 to 4 carbon atoms, the weight ratio of the siloxane to the silane being in the range of about 1:1 to 20:1.

---

Various additives such as silicones have been incorporated into polishes of all kinds, including automobile polishes, in an effort to impart various and sundry properties thereto. However, one desirable property almost universally still found lacking in the automobile polishes is detergent resistance. That is to say, when one washes their automobile with a detergent solution the protective wax coating laid down by the polish is generally removed.

It has now been discovered that when the reaction product of a hydroxyl endblocked polydimethylsiloxane having a viscosity in the range of about 10 to 15,000 cs. at 25° C., and a silane selected from the group consisting of those having the general formulae $$R''_n(R'O)_{3-n}Si(CH_2)_3NHR'''$$

and $R''_n(R'O)_{3-n}SiRNHCH_2CH_2NH_2$ wherein $R'''$ is a hydrogen atom or a methyl radical, $R''$ is a monovalent hydrocarbon radical free of aliphatic unsaturation and contains from 1 to 6 carbon atoms, $n$ has a value from 0 to 2, $R'$ is an alkyl radical containing from 1 to 4 carbon atoms and R is a divalent hydrocarbon radical free of aliphatic unsaturation and contains 3 to 4 carbon atoms, the weight ratio of the siloxane to the silane being in the range of about 1:1 to 20:1, is incorporated into a wax containing automobile polish, detergent resistance is imparted thereto.

While the viscosity of the polydimethylsiloxane is specified as being in the range of 10 to 15,000 cs., it should be noted that higher viscosities can be used. However, the detergent resistance and other properties of the polishes are significantly affected. Moreover, the hydroxyl groups are not as readily available for reacting in the higher viscosity materials. Generally a viscosity in the range of 20 to 1000 cs. is preferred.

$R''$ in the above formulae can be any monovalent hydrocarbon radical free of aliphatic unsaturation which contains from 1 to 6 carbon atoms. For example, $R''$ can be a methyl, ethyl, propyl, butyl, amyl, hexyl, cyclohexyl or a phenyl radical. There can be 0, 1 or 2 $R''$ radicals in the silane, i.e., $n$ is 0 to 2. Preferably $n$ is 0. When an $R''$ radical is present, it is preferably a methyl radical.

$R'$ in the above formulae can be any alkyl radical containing from 1 to 4 carbon atoms. Illustrative examples of $R'$ include the methyl, ethyl, propyl and butyl radicals. Preferably $R'$ is a methyl radical.

The R radical in the above formula can be any divalent hydrocarbon radical free of aliphatic unsaturation which contains 3 or 4 carbon atoms. As those skilled in the art know, there must be at least three carbon atoms between the silicon atom and the nitrogen atom joined by the R radical. Specific examples of R are the $$-CH_2CH_2CH_2-,\quad -CH_2CH_2CH_2CH_2-$$

and $-CH_2CH(CH_3)CH_2-$ radicals.

The weight ratios of the siloxane and silane used in preparing the reaction product should be in the range of 1:1 to 20:1 in order to obtain a polish having good gloss, and the desired detergent resistance. Preferably the ratio is in the range of 1:1 to 15:1. The reaction product can be prepared in various ways. The simplest way is by contacting the siloxane and silane in a liquid phase, for example, by cold blending. The siloxane and silane can also be reacted in a suitable solvent, with or without heating as desired. This process is well known to those skilled in the art as shown by British Patent 942,587.

The amount of the reaction product that can be added to an automobile polish will vary. Generally speaking, however, at least 1% by weight is usually necessary to obtain reasonable detergent resistance; and it is preferable to use at least 2.5%. While larger quantities, say up to about 10% or more can be used, it generally will not be as economical to use more than 5%. Basically, the amount of reaction product used will depend on the amount of wax in the formulation.

The reaction product can be used to impart detergent resistance to any of the standard types of automobile polishes; namely, solvent based polishes, water based (emulsion) polishes, or paste wax polishes.

The various waxes, solvents, surfactants, thickening agents, abrasives, dyes, odorants, and other ingredients normally used in making automobile polishes are well known to those skilled in the art and are described in numerous places in the literature. Specific illustrative examples of suitable ingredients will be set forth in the examples. Now in order that those skilled in the art may better understand how the present invention can be practiced, the following examples are given by way of illustration and not by way of limitation. All parts and percents referred to herein are on a weight basis and all viscosities measured at 25° C. unless otherwise specified.

EXAMPLE 1

A solvent based polish was prepared which consisted essentially of 92.5% V.M. & P. Naphtha, 5.0% Stoddard solvent, 1.0% of a microcrystalline wax (Be Square) and 1.5% of the reaction product of a hydroxyl endblocked polydimethylsiloxane having a viscosity of about 40 cs. and $(CH_3O)_3Si(CH_2)_3NHCH_2CH_2NH_2$, the weight ratio of the siloxane to the silane being about 2:1, said reaction product having been prepared by cold blending the siloxane and silane. The polish was prepared by first heating the wax, Stoddard solvent and reaction product together to melt the wax, then adding the V.M. & P. naphtha while stirring, and finally cooling.

The hood of a deep maroon 1966 Chevrolet was divided into six sections as shown in the following sketch.

|  | Hood |  |  |  |
|---|---|---|---|---|
|  | 1 | 2 | 3 |  |
| Rear |  |  |  | Front |
|  | 6 | 5 | 4 |  |

Its surface was thoroughly cleaned with solvent and abrasive. To sections 1–3 commercial automobile polishes were applied following the manufacturer's directions on the can. To sections 4–6 aerosoled polishes of this invention were applied, allowed to dry, and then buffed out. The aerosols consisted essentially of 50% of the composition, 15% of trichloromonofluoromethane propellant and 35% of dichlorodifluoromethane propellant, said percents being on a weight basis. Specifically, the polishes applied to each section were as follows:

(1) Turtle Wax paste
(2) Simoniz paste
(3) Top Kote
(4) Polish of Example 1
(5) Polish of Example 1 plus 0.167% of a trimethyl endblocked polydimethylsiloxane having a viscosity of about 12,500 cs.
(6) Polish of Example 1 plus 0.083% of a trimethyl endblocked polymethylsiloxane having a viscosity of about 12,500 cs.

The car was washed once a week. After one detergent washing the gloss (wax) was gone from sections 1 and 3. After three detergent washings the wax was almost completely gone from section 2. After six detergent washings sections 4–6 still contained fair amounts of gloss, section 4 being best. After 13 detergent washings section 4 still contained some gloss.

EXAMPLE 2

A paste wax polish was prepared which consisted essentially of 86.0% Stoddard solvent, 8.0% carnauba wax (Grey No. 3), 2.0% of an oxidized microcrystalline wax (Petronauba D), and 4.0% of the reaction product of Example 1. This is a good detergent resistant automobile polish.

EXAMPLE 3

A paste wax polish-cleaner was prepared which consisted essentially of 60.0% naphtha mineral spirits, 5.8% kerosene, 8.5% carnauba wax (Grey No. 3), 8.6% ozocerite wax, 8.5% diatomaceous earth and 8.6% of the reaction product of Example 1. This is a good detergent resistant automobile cleaner-polish.

EXAMPLE 4

A water based emulsion cleaner-polish was prepared by adding, with stirring, a mixture of 52 parts water, 14 parts diatomaceous earth and 2 parts soya lecithin to a mixture (which had been heated to melt the wax) of 22.5 parts naphtha mineral spirits, 12.5 parts kerosene, 8.0 parts carnauba wax (Grey No. 3), 2.4 parts of a polyoxyethylene sorbitan monooleate emulsifier (Tween 80), 2.0 parts of a fatty alcohol amine sulfate emulsifier (Dupanol OS) and 6.0 parts of the reaction of Example 1. After the addition was complete the product was cooled while stirring. This is a good detergent resistant automobile polish.

EXAMPLE 5

A solvent based polish was prepared that was identical to that of Example 1 except that the silane used in the reaction product was $CH_3(CH_3O)_2Si(CH_2)_3NHCH_2CH_2NH_2$ This polish was also found to be detergent resistant although not quite as good as the polish of Example 1.

EXAMPLE 6

Three polishes were prepared as in Example 1 except that the ratios of the siloxane to the silane were, respectively, 1:1, 10:1 and 20:1. In the first case the detergent resistance was very good although the gloss tended to become inferior as the amount of siloxane decreased. In the last two cases the gloss remained very good although there was some decrease in the detergent resistance as the amount of siloxane increased. All formulations were significantly better than commercial formulations with respect to detergent resistance and had an acceptable gloss.

EXAMPLE 7

When the silanes specified below, and hydroxyl endblocked polydimethylsiloxanes having the viscosities specified below, are substituted for their respective compounds in the reaction product of Example 1 in ratios from 3:1 to 15:1, automobile polishes are obtained which have similar detergent resistance.

| Silane: | Siloxane viscosity (cs.) |
|---|---|
| $(C_2H_5O)_3Si(CH_2)_3NH_2$ | 10 |
| $(CH_3O)_3SiCH_2CH(CH_3)CH_2NHCH_2CH_2NH_2$ | 80 |
| $CH_3O(CH_3)_2Si(CH_2)_3NHCH_2CH_2NH_2$ | 231 |
| $(CH_3O)_3Si(CH_2)_4NHCH_2CH_2NH_2$ | 1,000 |
| $(C_2H_5O)_3Si(CH_2)_3NH(CH_3)$ | 2,500 |
| $(CH_3H_7O)_3Si(CH_2)_3NHCH_2CH_2NH_2$ | 6,550 |
| $C_2H_5(CH_3O)_2Si(CH_2)_3NHCH_2CH_2NH_2$ | 10,000 |
| $C_6H_5(CH_3O)_2Si(CH_2)_3NHCH_2CH_2NH_2$ | 15,000 |

That which is claimed is:

1. In a wax containing automobile polish the improvement which consists of incorporating therein 1–10% by weight of the reaction product of a hydroxyl endblocked polydimethylsiloxane having a viscosity in the range of about 10 to 15,000 cs. at 25° C., and a silane selected from the group consisting of those having the general formulae $R''_n(R'O)_{3-n}Si(CH_2)_3NHR'''$ and $R''_n(R'O)_{3-n}SiRNHCH_2CH_2NH_2$ wherein $R'''$ is a hydrogen atom or a methyl radical, $R''$ is a monovalent hydrocarbon radical free of aliphatic unsaturation and contains from 1 to 6 carbon atoms, $n$ has a value of from 0 to 2, $R'$ is an alkyl radical containing from 1 to 4 carbon atoms, and R is a divalent hydrocarbon radical free of aliphatic unsaturation and contains 3 to 4 carbon atoms, the weight ratio of the siloxane to the silane being in the range of about 1:1 to 20:1, whereby said reaction product imparts detergent resistance to said polish.

2. An automobile polish as defined in claim 1 which is solvent based.

3. An automobile polish as defined in claim 2 which is in the form of an aerosol.

4. An automobile polish as defined in claim 1 which is water based.

5. An automobile polish as defined in claim 1 which is in the form of a paste wax.

6. An automobile polish as defined in claim 2 which consists essentially of 92.5% V.M. & P. naphtha, 5.0% Stoddard solvent, 1.0% microcrystalline wax and 1.5% of the reaction product of a hydroxyl endblocked polydimethylsiloxane having a viscosity of about 40 cs. at 25° C. and $(CH_3O)_3Si(CH_2)_3NHCH_2CH_2NH_2$, the weight ratio of the siloxane to the silane being about 2:1, said percents being on a weight basis.

7. An automobile polish as defined in claim 6 which is in the form of an aerosol and consists essentially of 50% of the composition of claim 6, 15% of trichloromonofluoromethane propellant and 35% of dichlorodifluoromethane propellant, said percents being on a weight basis.

8. An automobile polish as defined in claim 4 which consists essentially of 52.0 parts water, 14.0 parts diatomaceous earth, 2.0 parts soya lecithin, 22.5 parts naphtha mineral spirits, 12.5 parts kerosene, 8.0 parts carnauba wax, 2.4 parts polyoxyethylene sorbitan monooleate, 2.0 parts fatty alcohol amine sulfate, and 6.0 parts of the reaction product of a hydroxyl endblocked polydimethylsiloxane having a viscosity of about 40 cs. at 25° C. and $(CH_3O)_3Si(CH_2)_3NHCH_2CH_2NH_2$, the weight ratio of the siloxane to the silane being about 2:1, said parts being by weight.

9. An automobile polish as defined in claim 5 which consists essentially of 86.0% Stoddard solvent, 8.0% carnauba wax, 2.0% microcrystalline wax, and 4.0% of the reaction product of a hydroxyl endblocked polydimethylsiloxane having a viscosity of about 40 cs. at 25° C. and $(CH_3O)_3Si(CH_2)_3NHCH_2CH_2NH_2$, the weight ratio of the siloxane to the silane being about 2:1, said percents being on a weight basis.

10. An automobile polish as defined in claim 5 which consists essentially of 60.0% naphtha mineral spirits, 5.8% kerosene, 8.5% carnauba wax, 8.6% ozocerite wax, 8.5% diatomaceous earth, and 8.6% of the reaction product of a hydroxyl endblocked polydimethylsiloxane having a viscosity of about 40 cs. at 25° C. and $$(CH_3O)_3Si(CH_2)_3NHCH_2CH_2NH_2$$

the weight ratio of the siloxane to the silane being about 2:1, said percents being on a weight basis.

References Cited

UNITED STATES PATENTS

| | | |
|---|---|---|
| 2,803,610 | 8/1957 | Kress. |
| 2,947,771 | 8/1960 | Bailey. |
| 3,045,036 | 7/1962 | Jex et al. |
| 3,110,601 | 11/1963 | Emblen et al. _____ 106—3 XR |
| 3,175,921 | 3/1965 | Hedlund _____ 106—10 XR |
| 3,306,869 | 2/1967 | Lahr et al. _____ 106—10 XR |
| 3,329,520 | 7/1967 | Emblem et al. |
| 3,341,338 | 9/1967 | Pater _____ 106—10 |
| 2,902,376 | 9/1959 | Beacher et al. _____ 106—10 |

JULIUS FROME, Primary Examiner

J. B. EVANS, Assistant Examiner

U.S. Cl. X.R.

106—11, 14, 272, 285; 117—64, 135, 135.1, 168; 252—305